W. F. EWALD.
RESILIENT WHEEL.
APPLICATION FILED SEPT. 4, 1917
1,289,420.
Patented Dec. 31, 1918.
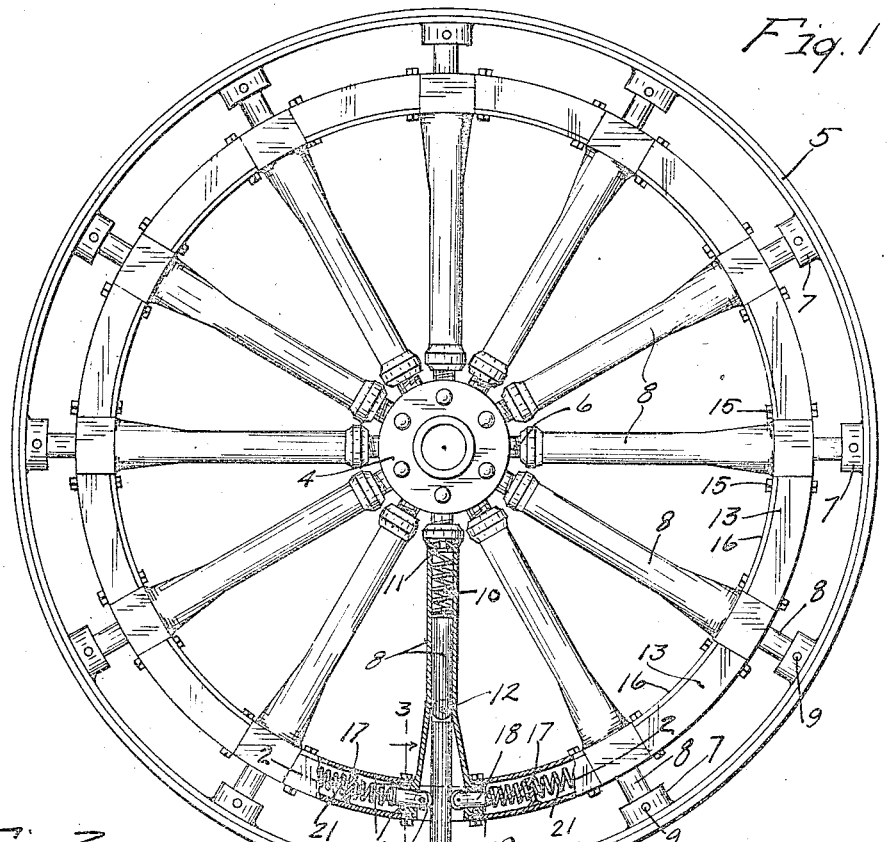
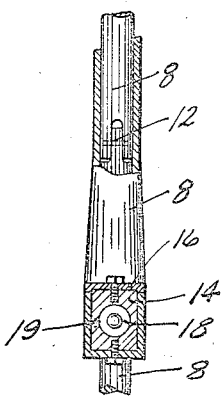
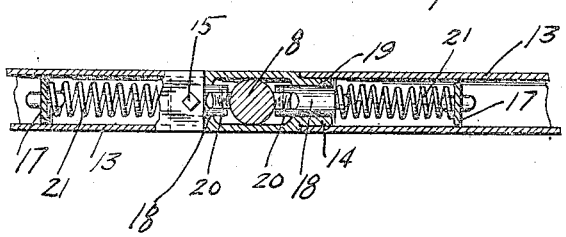
WITNESSES
G. J. Williamson
E. E. Wells
INVENTOR
W. F. Ewald
By his attorneys
Williamson & Merchant

UNITED STATES PATENT OFFICE.

WILLIAM F. EWALD, OF JAVA, SOUTH DAKOTA.

RESILIENT WHEEL.

1,289,420.  Specification of Letters Patent.  Patented Dec. 31, 1918.

Application filed September 4, 1917. Serial No. 189,470.

*To all whom it may concern:*

Be it known that I, WILLIAM F. EWALD, a citizen of the United States, residing at Java, in the county of Walworth and State of South Dakota, have invented certain new and useful Improvements in Resilient Wheels; and I do hereby declare the following to be a full, clear, and exact description of the invention, such as will enable others skilled in the art to which it appertains to make and use the same.

My invention relates to improvements in resilient wheels; and, to this end, it consists of the novel devices and combinations of devices hereinafter described and defined in the claim.

In the accompanying drawings, which illustrate the invention, like characters indicate like parts throughout the several views.

Referring to the drawings,

Figure 1 is a side elevation of the improved wheel, some parts being broken away and some parts being shown in section;

Fig. 2 is a view, principally in section taken on the line 2—2 of Fig. 1, on an enlarged scale; and Fig. 3 is a detail view with some parts sectioned on the line 3—3 of Fig. 1.

The numeral 4 indicates the hub of the wheel and the numeral 5 indicates the outer rim thereof. Projecting radially from the hub 4, is a multiplicity of screw-threaded studs 6, and projecting from the inner face of the outer rim 5, is a multiplicity of bosses 7 located on the same radial lines with the studs 6. Two-part spokes 8 connect the hub 4 and rim 5. The inner members of these spokes 8 are tubular with outer end portions that flare circumferentially, with respect to the wheel, and their inner ends are secured to the hub 4 by screwing the same onto the studs 6. The outer ends of the outer members of the spokes 8 are inserted into the bosses 7 and secured thereto by transverse pins 9.

Coiled springs 10, mounted in the tubular inner members of the spokes 8, are compressed between the outer members of said spokes and shoulders 11 formed in the inner members thereof. The outer members of the spokes 8 are provided with joints 12, which permit their outer end portions to swing circumferentially, with respect to the wheel, in the flaring end portions of the inner members of the spokes to permit the required eccentric movement of the wheel hub 4, with respect to the outer rim 5, and thereby make the wheel resilient, under the action of the springs 10.

A sectional inner rim 13 rigidly and detachably connects the inner members of the spokes at their outer ends and securely holds the same in their proper positions. As shown, the sections of the inner rim 13 are identical, one with the other, and each thereof is hollow with open ends and rectangular in cross section. The open ends of the rim sections 13 embrace correspondingly formed bosses 14, integrally formed with the inner members of the spokes 8, and are detachably and rigidly secured thereto by machine screws 15. It will be noted that the inner side of each rim section 13 is made removable and affords a cover plate 16. Integrally formed within each rim section 13, is a transverse abutment 17.

Plungers 18 are mounted in seats 19 formed in the bosses 14 for circumferential movement, with respect to the wheel. Each plunger 18 has journaled on one of its ends a grooved roller or wheel 20 and which rollers extend into the flaring outer end portion of the inner member of the spokes 8 and engage opposite faces of the outer end portions of the outer members of the spokes 8. The other ends of these plungers 18 project into the hollow inner rim sections 13 and coiled springs 21 are compressed between said plungers and the abutments 17. Obviously, the plungers 18 yieldingly hold the outer end portions of the outer members of the spokes 8 circumferentially centered, with freedom for endwise movement.

From the above description, it is evident that by removing the cover plates 16, access may be had to the interior of the inner rim sections 13, thus making it extremely easy to assemble the wheel or make repairs. It will be noted that the sides of the outer end portions of the inner members of the spokes 8 are made flat to fill the gaps between the inner rim sections 13, and thereby give the wheel a neat and finished appearance.

What I claim is:—

A resilient wheel having a hub, an outer rim, two-part spokes connecting the hub and outer rim, the inner members of the spokes being tubular and having outer end portions that flare circumferentially, the sides of the inner members of the spokes holding the outer members of the spokes against lateral movement, hollow inner rim sections having abutments and detachably connecting adjacent inner members of the spokes, springs under strain to move the outer members of the spokes radially outward, said outer members having joints arranged to permit their outer end portions to swing in the flaring end portions of the inner members of the spokes, opposing pairs of roller-equipped plungers mounted in seats formed in the inner members of the spokes with their rollers directly engaging circumferentially opposite sides of the outer end portions of the inner members of the spokes and with their other ends extending into the inner rim sections, and springs compressed between the plungers and abutments.

In testimony whereof I affix my signature in presence of two witnesses.

WILLIAM F. EWALD.

Witnesses:
 SIG. ROSENTHAL,
 CHRIST MAASZ.